United States Patent [19]

Eickel et al.

[11] 4,286,157
[45] Aug. 25, 1981

[54] APPARATUS FOR ASCERTAINING AND/OR REGULATING THE AMOUNTS OF RADIATION IN THE MAKING OF X-RAY IMAGES

[75] Inventors: Rolf Eickel; Dieter Tolksdorf, both of Munich, Fed. Rep. of Germany

[73] Assignee: Agfa-Gevaert Aktiengesellschaft, Leverkusen, Fed. Rep. of Germany

[21] Appl. No.: 69,806

[22] Filed: Aug. 27, 1979

[30] Foreign Application Priority Data

Aug. 31, 1978 [DE] Fed. Rep. of Germany ....... 2838057

[51] Int. Cl.³ .............................................. G01T 1/22
[52] U.S. Cl. ..................................... 250/370; 250/451
[58] Field of Search ................ 250/370, 374, 375, 451

[56] References Cited

U.S. PATENT DOCUMENTS

| | | | |
|---|---|---|---|
| 3,449,570 | 6/1969 | Kok | 250/439 R |
| 3,450,879 | 6/1969 | Seppi | 250/370 |
| 3,991,316 | 11/1976 | Schmidt | 250/439 R |
| 4,045,674 | 8/1977 | Vermeulen | 250/370 |

Primary Examiner—Craig E. Church
Attorney, Agent, or Firm—Peter K. Kontler

[57] ABSTRACT

A dosimeter for use in mammographs wherein a plate-like body of electrically non-conductive hard foamed material generates charge carriers in response to exposure to radiation. The body is provided with electrodes which are connected with an energy source. The output signal of the dosimeter is used to regulate the amounts of radiation to which an object is exposed. The entire dosimeter can be installed between the source of radiation and X-ray film or another carrier of images of objects because the dosimeter does not cast a shadow on the film when the object is exposed to radiation.

15 Claims, 3 Drawing Figures

APPARATUS FOR ASCERTAINING AND/OR REGULATING THE AMOUNTS OF RADIATION IN THE MAKING OF X-RAY IMAGES

BACKGROUND OF THE INVENTION

The present invention relates to improvements in apparatus for ascertaining and/or regulating the amounts of radiation for the making of images with X-rays, gamma rays or analogous radiation. More particularly, the invention relates to improvements in so-called dosimeters which are apparatus serving to measure the doses or the effects of doses of ionizing radiation. Still more particularly, the invention relates to improvements in dosimeters which can be used with advantage in mammography.

A dosimeter is needed in order to automatically regulate the exposure of mamma during the making of X-ray images or similar images in a mammograph. The dosimeter determines the necessary and/or maximum permissible amounts of radiation. Many presently known dosimeters constitute ionization chambers which are filled with air or another gas. Other types of presently known dosimeters include semiconductor measuring cells which are sensitive to X-rays.

A drawback of presently known dosimeters, especially those which are used in mammography, is that they absorb a substantial percentage of X-rays in the voltage range between 25 and 50 kilovolts. Consequently, such dosimeters are imaged on the image carrier of the mammograph provided that they are installed between the source of X-rays and the image carrier (e.g., an X-ray film or another record carrier whose image can be rendered visible by resorting to toner particles or the like). The placing of a conventional dosimeter behind the image carrier is even more undesirable because (depending on the thickness of the object to be X-rayed, on the nature of the filter means for the X-ray tube and/or on the selected voltage of the tube) more than 80 percent and, under unfavorable circumstances, in excess of 90 percent of radiation is absorbed in the chamber. This distorts and renders highly unreliable the measurements which are carried out by the dosimeter, i.e., the doses of radiation to which an object is exposed can deviate very substantially from the actual doses. In other words, the resuls of measurements are much more accurate if the dosimeter is placed between the radiation source and the image carrying sheet, such as an X-ray film or the like. As stated above, conventional dosimeters are not particularly suited for such mode of installation because their images are clearly visible on the image carrier.

OBJECTS AND SUMMARY OF THE INVENTION

An object of the invention is to provide a novel and improved dosimeter which is practically transparent as concerns its transmissivity to X-rays and gamma rays, especially to relatively low-energy radiation.

Another object of the invention is to provide a dosimeter whose image does not appear on X-ray film or another image or record carrying medium even if the dosimeter is placed between the source of radiation and the image carrying medium and into close proximity of such medium.

A further object of the invention is to provide the dosimeter with a novel and improved charge carrier generating component or body.

An additional object of the invention is to provide an imaging chamber for X-ray apparatus which embodies the improved dosimeter.

A further object of the invention is to provide an apparatus for making images of bodies with gamma rays or X-rays which embodies a dosimeter of the above outlined character.

The improved dosimeter comprises a body of foamed material which is electrically non-conductive and generates charge carriers on exposure to certain types of radiation, especially X-rays or gamma rays. It has been found that, quite surprisingly, the majority of commercially available foamed materials generate charge carriers in response to exposure to X-rays, gamma rays or similar radiation. Such charge carriers can be taken off in the form of a current which is proportional to the momentary amount or doses of radiation. The means for obtaining such current preferably includes electrodes which are applied to selected (preferably opposite) sides of the body of foamed material.

The utilization of a body of foamed material exhibits the advantage that the ionizing means need not be confined in a container (the same as if the ionizing medium were a gas). Such containers invariably or at least frequently absorb substantial amounts of radiation. Therefore, a gas container which is used in a mammograph invariably casts a pronounced shadow upon the image bearing medium (e.g., X-ray film) if the container is placed between the source of radiation and the film.

The aforementioned foamed body preferably consists of hard synthetic plastic material which enables the dosimeter to stand very pronounced mechanical stresses, i.e., a dosimeter embodying a plate or the like of hard foamed material exhibits a pronounced stiffness and/or a pronounced resistance to compression irrespective of the exact nature of mechanical stresses.

The aforementioned foamed material can be used with particular advantage in dosimeters for ascertainment of relatively low-energy radiation (such as X-rays or gamma rays), for example, within the energy ranges which are customary in the making of mammograms. It has been found that the foamed body offers little, if any, resistance to the passage of X-rays within the energy ranges which are desirable and customary in connection with the making of mammograms; this is in contrast to conventional dosimeters which employ gas-filled containers or the like.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
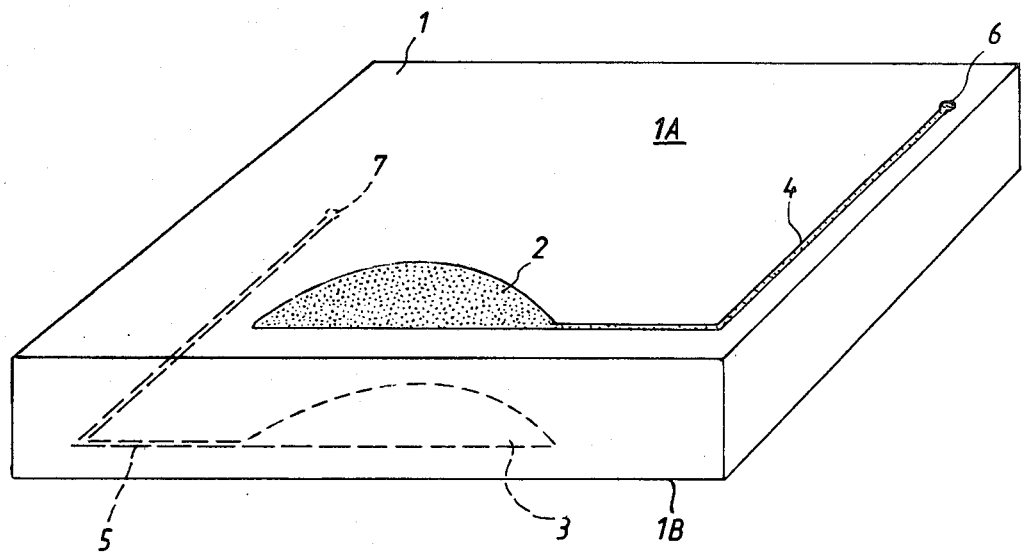
FIG. 1 is a perspective view of a dosimeter which embodies one form of the invention.

The dosimeter of FIG. 1 comprises a hard plate 1 of foamed synthetic plastic material, preferably a polyacrylic resin. Other suitable synthetic plastic substances include polyurethane foam, styropor and eccofoam. Basically, the dosimeter may comprise any hard foamed plastic material which is electrically non-conductive and generates charge carriers in response to exposure to radiation.

The front and rear sides 1A and 1B of the plate 1 are respectively provided with electrodes 2 and 3. The dimensions and/or configuration of the electrodes 2, 3 depend on the size and shape of the object to be examined. Thus, if the dosimeter is used in a mammograph, the dimensions of the electrodes 2, 3 will correspond to those of the mamma. However, it is equally within the purview of the invention to provide the plate 1 with electrodes at least one of which completely covers the respective surface 1A or 1B. The electrodes 2, 3, consist of a thin electrically conductive material, e.g., finely comminuted graphite powder which is sprayed onto the plate 1, or aluminum deposited vapors. Such electrodes do not appreciably influence the permeability of the dosimeter to X-rays; in fact, the extent to which X-rays are intercepted by such electrodes is negligible or nil.

The electrodes 2, 3 are respectively connected with conductors 4, 5 which, in turn, are connected to terminals 6, 7. When the dosimeter is in use, a potential difference in the range between several hundred and a few thousand volts is applied across the terminals 6 and 7. For example, the applied potential can be in the range of 500–1000 volts.

When the plate 1 is exposed to X-rays, the foamed material is ionized between the electrodes 2, 3 and there is induced the flow of a current which is proportional to the incoming radiation as well as to the volume of foamed material between the electrodes 2, 3. The just mentioned current is not dependent on the quality of radiation in that region of X-ray radiation which is of interest in connection with mammography.

The signal which is taken off at the terminals 6, 7 and is proportional to the quantity of X-rays to which the dosimeter is exposed, is further processed in the customary way, e.g., it is electronically amplified and its intensity indicated on a screen or by a gauge. Alternatively, the signal can be used for automatic regulation of the quantity of X-rays to which an object is being exposed. For example, the signal can be used to automatically turn off the source of X-rays when the quantity of radiation reaches a preselected or maximum permissible value.

The dosimeter of FIG. 1 can be readily installed between a source of X-rays (especially a low-energy source) and the X-ray chamber (e.g., a chamber for reception of X-ray film). This is due to the fact that the dosimeter is practically transparent to X-rays, i.e., the percentage of intercepted X-rays is extremely low and, therefore, the dosimeter is not imaged on X-ray film or other suitable carrier material for images of X-rayed objects. For example, if the source of X-rays is located above the object and the X-ray chamber, the dosimeter can be installed between the source and the chamber. However, it is equally possible to install the dosimeter in the interior of the chamber. This is especially advisable and/or advantageous if the chamber is constructed and assembled in a manner as disclosed, for example, in German Offenlegungsschrift No. 26 42 084 wherein the record carrier (e.g., X-ray film) is disposed behind an electrode consisting of hard foamed synthetic plastic material. By adding a second electrode, such foamed electrode and the second electrode can constitute a detector for the amounts of X-rays.

Figure 2:
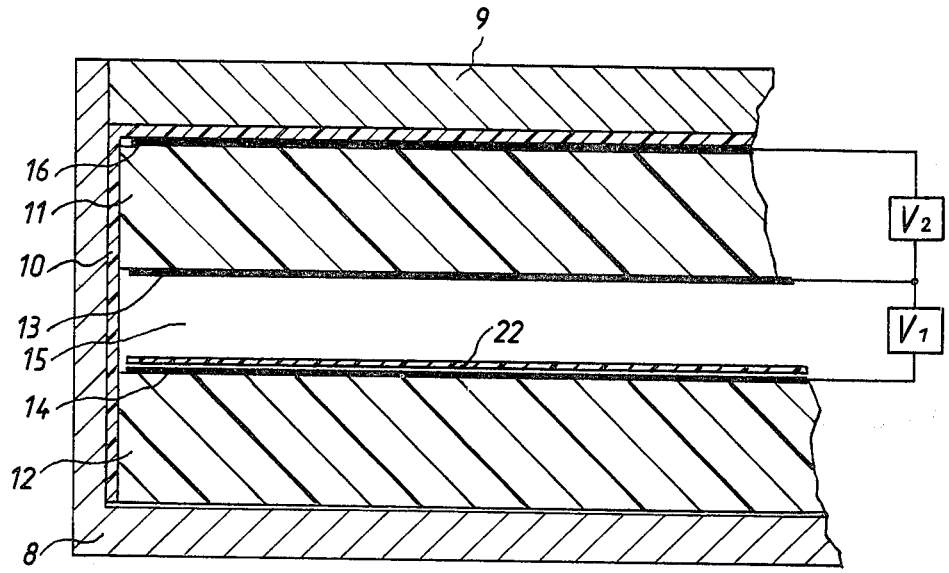
FIG. 2 is a fragmentary sectional view of a dosimeter which embodies the invention and is incorporated into an electroradiographic imaging chamber.

The just discussed structure is shown in FIG. 2. There is illustrated an imaging chamber for the making of electroradiographic images; such chamber resembles that which is disclosed in German Offenlegungsschrift No. 26 42 084. The chamber includes a housing comprising a metallic casing 8 and a cover 9 of beryllium. The inner side of the housing is coated with a layer or liner 10 of polyurethane. The housing further contains plastic carriers 11, 12 for electrodes 13, 14 which confine a gas-filled ionization chamber 15. A source $V_1$ of high-voltage energy is connected between the electrodes 13, 14. The purpose of this source is to insure that, when an object is exposed to X-rays, the charge carriers which are generated in the chamber 15 travel toward the electrodes to thereby produce an electrostatic image on record or image carrier 22 which is adjacent to the electrode 14. The image is thereupon made visible in any suitable conventional manner.

The plastic carrier 11 which supports the electrode 13, and which may consist or preferably consists of hard polyurethane foam or a hard polyacrylic foam, can be used as a constituent of an improved dosimeter by the simple expedient of applying thereto a second electrode 16 opposite the electrode 13. Thus, the carrier 11 can be said to be a functional equivalent of the plate 1, and the electrodes 13, 16 can be said to constitute functional equivalents of electrodes 2, 3 shown in FIG. 1. The electrodes 13, 16 are connected with a second energy source $V_2$. The arrangement of FIG. 2 saves a discrete dosimeter, i.e., at least some components of the dosimeter of FIG. 2 constitute parts of the imaging chamber.

Figure 3:
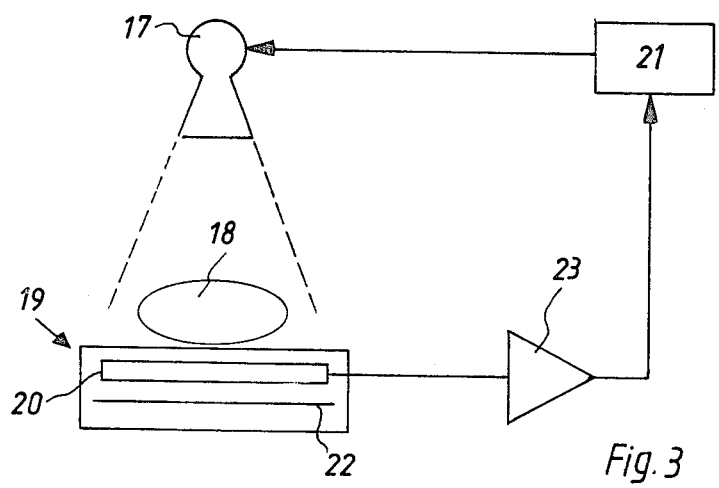
FIG. 3 is a diagram showing the dosimeter in a mammograph.

FIG. 3 shows schematically the mode of regulating a source 17 of X-rays. The object is shown at 18 and the imaging chamber is illustrated at 19. The reference character 20 denotes the dosimeter, and the record carrier (e.g., X-ray film) is shown at 22. The dosimeter 20 is installed between the object 18 and the image carrier 22. The output signal of the dosimeter 20 is amplified by an integrating amplifier 23 whose output is connected to the input of a control circuit 21 for the source 17. The purpose of the circuit 21 is to turn off the source 17 when the object 18 has been exposed to a sufficient amount of radiation, i.e., when the doses of X-rays suffice to insure satisfactory exposure and/or charging of the image carrier 22.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In a dosimeter for X or gamma radiation, a pair of electrodes; a body of foamed material which is electrically non-conductive and generates charge carriers on exposure to said radiation situated intermediate and being in electrically conductive contact with said electrodes; and means for deriving from said electrodes electric current proportionate to the amount of radiation to which said body has been exposed, including a source of electric potential having terminals of opposite polarities respectively electrically connected to said electrodes.

2. The structure of claim 1, wherein said body consists of rigid foamed synthetic plastic material.

3. The structure of claim 2, wherein said plastic material is a polyacrylic resin.

4. The structure of claim 1, wherein said body constitutes the ionization volume of the dosimeter.

5. The structure of claim 4, wherein the entire body which constitutes the ionization volume consists of rigid foamed synthetic plastic material.

6. The structure of claim 4, wherein said body has a first and a second side, and wherein said electrodes are relatively thin layers of electrically conductive material applied to said sides of said body.

7. The structure of claim 6, wherein said body includes a plate and said first and second sides are disposed opposite each other.

8. The structure of claim 7, wherein at least one of said layers overlies only a portion of the respective side of said plate.

9. In an arrangement for making X-ray images on a carrier, a source of X or gamma radiation directed toward the carrier; and a dosimeter interposed between said source and the carrier and including a pair of electrodes, a body of foamed material which is electrically non-conductive and generates charge carriers on exposure to said radiation situated intermediate and being in electrically conductive contact with said electrodes, and means for deriving from said electrodes electric current proportionate to the amount of radiation to which said body has been exposed, including a source of electric potential having terminals of opposite polarities respectively electrically connected to said electrodes.

10. The structure of claim 9, wherein said source is a source of X-rays and gamma rays.

11. The structure of claim 10, wherein said source operates in the range of 25 to 50 kilovolts.

12. In a mammograph, the combination of means for supporting a record carrier; a source of X or gamma radiation directed toward the record carrier; and a dosimeter interposed between said source and the record carrier and including a pair of electrodes, a body of foamed material which is electrically nonconductive and generates charge carriers on exposure to said radiation situated intermediate and being in electrically conductive contact with said electrodes, and means for deriving from said electrodes electric current proportionate to the amount of radiation to which said body has been exposed, including a source of electric potential having terminals of opposite polarities respectively electrically connected to said electrodes.

13. The structure of claim 12, said supporting means comprising an electroradiographic chamber.

14. The structure of claim 13, said chamber including a housing having a wall facing said source and said dosimeter being disposed in said housing adjacent said wall.

15. The structure of claim 14, wherein said wall consists of beryllium.

* * * * *